ABSTRACT OF THE DISCLOSURE

Process for the preparation of linear, high molecular weight, sulphur vulcanizable copolymers of ethylene, propylene and butadiene in the presence of catalytic systems prepared in aromatic solvents and comprising hydrocarbon soluble vanadium compounds, organic aluminum compounds containing halogen, and the product of the reaction between dialkyl aluminum halides and oxygen compounds selected from the group consisting of water and tin oxides of the formula $R_3Sn$—O—$SnR_3$, also said catalytic systems.

---

The present invention concerns a process for the polymerization of ethylene, propylene and 1,3-butadiene to unsaturated, amorphous, or substantially amorphous, high molecular weight, linear copolymers which are free of homopolymers and vulcanizable by means of conventional methods into elastomeric products of particular elastic-mechanical and dynamic characteristics which make them suitable for use as elastic rubbers for valuable applications.

Although ethylene-propylene-butadiene copolymers have been known from the prior art, such copolymers having characteristics as to make them practically usable for the preparation of elastic rubbers which are suited for valuable applications, were described for the first time in Italian patent application in the name of the applicants, filed on Dec. 31, 1968 under file number 25,752 A/68 and corresponding to U.S. application Ser. No. 888,858, filed Dec. 29, 1969.

These copolymers have the peculiar characteristics of being completely soluble in n.heptane at room temperature and showing, when vulcanized with conventional mixtures based on sulphur, accelerators, coadjuvants and carbon black of the highly reinforcing type, a tensile strength of more than 150 kg./sq. cm. along with elongations at break of between 300% and 550%. Furthermore, such vulcanized products, when obtained from copolymers with a content of butadienic units greater than 1% by weight and of propylenic units between 25% and 70% by weight, present a permanent set, after an elongation of 200%, lower than 20%.

These particular copolymers have been obtained by a process which utilizes a catalytic system prepared in the presence of an aromatic hydrocarbon and comprising a vanadium compound soluble in hydrocarbons, at least one dialkylaluminum monohalide and at least one aluminum compound containing halogen, in which the ratio between the halogen atoms and the aluminum atoms is greater than 1.

With other catalytic ssytems such as those described in Italian Pat. 664,796, consisting of vanadium compounds soluble in hydrocarbons and of organic aluminum compounds containing organic groups of a high steric volume, or with catalytic systems such as those described in the Italian Pat. 664,770, consisting of a vanadium compound soluble in hydrocarbons and of organic aluminum compounds containing mono-unsaturated hydrocarbon groups, it has previously been possible to obtain ethylene-propylene-butadiene copolymers with good characteristics. These products contained, however, fractions which were soluble in n.heptane only at boiling temperature and, when vulcanized with mixtures based on sulphur and containing carbon black, did not display, with respect to the pure vulcanized products, the increase of elastic-mechanical properties which is characteristic of high grade rubbers.

It has now surprisingly been found that it is possible to obtain ethylene-propylene-1,3-butadiene copolymers altogether similar to those described in the Italian patent application, file number 25,752 A/68, cited above, by using a catalytic system prepared in the presence of an aromatic hydrocarbon and comprising:

(a) at least one vanadium compound soluble in hydrocarbons,
(b) the product of the reaction between one or more dialkylaluminum monohalides and an oxygen compound selected from the group consisting of water and a tin oxide of the formula $R_3Sn$—O—$SnR_3$, wherein R is an alkyl group, in a molar ratio equal to 2:1, and
(c) one or more organic aluminum compounds containing halogen.

Component (a) is preferably chosen from amongst vanadium halides, vanadium oxyhalides, vanadium acetylacetonates, vanadyl acetylacetonates, vanadyl halogenacetylacetonates, vanadium alcoholates and vanadyl halogenalcoholates. Examples of such compounds are: vanadium tetrachloride, vanadium tetrabromide, vanadium oxytrichloride, vanadium triacetylacetonate, vanadyl diacetylacetonate, vanadyl chlorodiacetylacetonate and ethyl orthovanadate. However, the preferred compound is vanadium triacetylacetonate.

As reactants for the preparation of component (b) there are used dialkylaluminum monohalides in which the linear or branched alkyl radicals contain up to 16 carbon atoms while the halogen is chlorine or bromine, the chlorine being preferred. Also the alkyl radicals of the tin compound contain preferably up to 16 carbon atoms. In each case, most preferred are alkyl radicals having 2 to 10.

Examples of aluminum compounds that may be used for the preparation of component (b) of the catalytic system are: diethyl-aluminum monochloride and di-iso-butylaluminum monochloride.

Examples of tin compounds that may be used for the preparation of component (b) of the catalytic system are: bis (tri-n.butyl-tin) oxide, bis(triisobutyltin) oxide, bis (triethyltin) oxide.

Component (b) may be prepared separately, for instance by reacting dialkyl-aluminum monochloride with water according to L. Porri, A. Di Corato and G. Natta (J. Polymer Science, part B, 5, 325 (1967)), and by then completing the reaction at 80° C. for from 1 to 3 hours. The reaction may, however, also be carried out in a different way, that is, by reacting the two components in an aromatic solvent either outside or inside the polymerization reactor for a much shorter time, even at room temperature. It is preferred to conduct the reaction while avoiding local concentrations of water, which may give place to the formation of undesirable reaction products, detrimental to the polymerization. For this purpose, it is convenient that the water be completely dissolved in the aromatic solvent or in the olefins and that it be not suspended in the form of droplets. For the same reason it is also advisable to add the reactants containing the water to the dialkylaluminum halides. The success of the reaction is generally indicated by the complete solubility of the reaction product in the reaction medium.

According to the literature, by the reaction of diethyl-aluminum monochloride with water, as main products there are obtained compounds having the following structure:

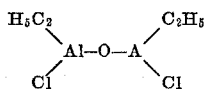

(L. Porri et al.—Jour. of Polymer Sci., part B, 5, 325 (1967), and C. Longiave, R. Castelli—Jour. of Polymer Sci. part C, 4, 387 (1963)), and/or respectively

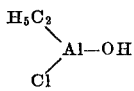

(M. Gippin—Ind. Eng. Chem. Prod. Res. Dev. 1, 32 (1962)). It is thus likely that such compounds are present in component (b) of the catalytic system of this invention and that they contribute to the catalytic activity of the same.

As to the use of the tin oxides as reactants with the alkyl aluminum halides there is reason to believe, though no final confirmation has been obtained yet and although it has no limiting character on this invention, that also the main product of the reaction between $R_2AlX$ and

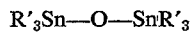

(wherein R and R' are the same alkyl radicals different from each other and where X is a halogen) in the molar ratio of 2:1, for the preparation of component (b) of the catalytic system, is constituted by:

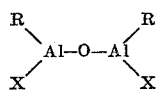

Also in this case, component (b) of the catalytic system may be prepared separately and may be added to the reaction mixture later, or it may be prepared directly in the reaction mixture itself, by separately feeding the dialkylaluminum monohalide and the bis (trialkyltin) oxide and by causing them then to react in the presence of one or more monomers and/or one or more other components of the catalytic system.

It is, however, preferable that the product of said reaction, when carried out separately, be not aged for a long stretch of time, nor be kept at a low temperature. The aromatic solvent is generally chosen from amongst benzene, toluene, xylene, ethyl-benzene, isopropyl-benzene or mixtures of the same. Preferred solvents are: benzene and toluene.

The aromatic solvent has, amongst others, the function of dissolving all the components and the reaction products of the catalytic system, and, according to a non-limiting interpretation of the invention, also a complexing function. In any case, the presence of the aromatic solvent is quite critical for the preparation of the catalytic system of this invention.

It is advisable that the aromatic solvent be present in the polymerization mixture in such quantities as to constitute from 2% to 80% by volume of the whole polymerization mixture consisting of aromatic solvent, catalytic system, ethylene, propylene and butadiene. When the percentage of aromatic solvent exceeds a certain limit, which varies mainly with the varying of the desired composition of the copolymer, it permits polymerization in solution, that is, the whole copolymer is dissolved during the whole course of the polymerization. This limit, for the copolymer compositions most commonly chosen, amounts to about 20-40% by volume based on the total of the polymerization mixture.

In addition to the aromatic solvent, it is also possible to use a hydrocarbon of a different nature as a further solvent. The ratio between aluminum atoms (components b+c) and vanadium atoms (compound a) of the catalytic system should be higher than 5:1; preferably it should however be between 10:1 and 60:1, although higher ratios may also be used.

The molar ratio between components (c) and (b) of the catalytic system is suitably chosen between 1:10 and 10:1, but preferably it will be comprised between 1:5 and 5:1. The quantity of catalyst generally used for this polymerization, expressed in moles of vanadium compound per global moles of the three monomers in liquid phase, is generally comprised between 1:10,000 and 1:200,000, but is preferably comprised between 1:15,000 and 1:100,000. However, these ratios are merely suggested and are not critical.

The molar ratio of propylene/butadiene in liquid phase, must be mainly regulated depending on the composition desired for the copolymer (depending both on the butadienic units as well as on the propylenic units), on the quantity of solvent used and on the particular catalytic composition. In order to obtain copolymers having the preferred compositions of this invention, there are chosen suitable molar ratios of propylene/butadiene in liquid phase comprised between 5:1 and 200:1, but preferably comprised between 20:1 and 100:1. Also the molar ratios of propylene/ethylene must be primarily regulated in relation to the three factors indicated in the case of the propylene/butadiene ratios. In order to obtain copolymers having the compositions preferred by this invention, there are generally used molar ratios of propylene/ethylene in liquid phase varying between 4:1 and 50:1, but preferably varying between 8:1 and 30:1.

The total pressure at which polymerization is conducted depends, in addition to the polymerization temperature, also on the chosen ratios of the monomers and of the solvents in liquid phase. By operating, for instance, at 0° C., one will normally obtain total pressures varying from 3 to 9 absolute atmospheres. The corresponding partial pressures, always at a temperature of 0° C., are $$P_{C_3H_6}=2.05-5.4 \text{ at: } P_{C_2H_4}=0.5-2.5 \text{ at.}$$

The polymerization temperature is generally chosen vitamin the range of —30° to +20° C., although the preferred temperature is between —10° and +10° C. The polymerization may be carried out both in a discontinuous as well as continuous way. In the continuous polymerization, the components of the catalytic system may be fed into the reactor separately. However, the reaction may be carried out also between one part or all the catalytic components in a separate reactor and then feeding into the polymerization reactor the mixture thus obtained. This last procedure is valid particularly for the formation of catalytic component (b) in the presence of an aromatic solvent.

In order to operate under uniform conditions and to obtain a copolymer having a substantially constant composition, one must not only maintain the partial pressures of the various olefins as indicated above, but also maintain thorough stirring of the reaction mixture, thus ensuring a constant equilibrium between the gaseous phase and the liquid phase and a constant ratio between the olefins in liquid phase. For certain applications, when operating in a discontinuous way, it may however also be convenient to prepare copolymers with a not perfectly constant composition. In this case the ethylene may be fed starting from $P_{C_2H_4}=0$ and reach in time the desired partial pressure. In this way one obtains initially copolymers richer in propylene and butadiene units and subsequently copolymers richer in ethylene units than the average copolymer would have. The random distribution of the units in the single fractions is however preserved.

The conditions and the preparation procedures of the catalytic system may have a considerable influence on the course of the polymerization, on the composition and on the quality of the copolymers obtained. The temperature at which the catalyst components are contacted with each other may vary normally between 20° C. and −30° C., though preferably it is the same as the polymerization temperature. It is preferable not to "age" the catalyst, that is, the addition of the last catalytic component is preferably performed after or immediately before that of the last olefin. When operating in this way it is preferable to add the vanadium compound (a) last. The preferred order in which the reactants are contacted with each other in a process of discontinuous operation and by operating with the copolymer in solution, when water is used as the reactant for the preparation of the catalyst component (b), is as follows: the already pre-formed component (b) (or only the dialkylaluminum halide part of it) is added to the mixture of aromatic solvent and butadiene. Thereupon, to this mixture is added the propylene (anhydrous propylene when (b) had already been pre-formed, or containing dissolved a suitable quantity of water in case it is wished to conduct the formation of the catalytic component (b) in the polymerization reactor). After a pre-fixed time, there is established the desired partial pressure of ethylene. There is then added the catalytic component (c) and finally component (a). However, catalytic component (c) may also be added before the two monoolefins. As indicated above, for special reasons it may, however, be preferable to add the ethylene last.

When tin oxide is used as a reactant for the preparation of the catalyst component (b), into the reactor are introduced first the chosen aromatic hydrocarbon, then the butadiene and finally component (c) of the catalytic system. Thereafter are introduced in the order: the dialkylaluminum monochloride, the bis(trialkyltin) oxide, the propylene and finally component (a) of the catalytic system contemporaneously with or immediately before the ethylene.

In case one chooses to use as component (c) of the catalytic system a dialkylaluminum monohalide, it is possible to carry out one single addition of this compound, which will thus partly serve as a reactant for the bis (trialkyltin) oxide and will lead to the formation of component (b), and partly will serve as component (c).

On the contrary when utilizing a suspension system, that is, with the polymer precipitating during the polymerization, or when operating in a continuous manner, there will have to be applied suitable modifications.

One of the characteristics of this process is the full solubility of the catalytic system in the aromatic solvent. The solubility of the catalytic system in the aromatic solvent is one of the requirements for obtaining a distribution of the various monomeric units in all the macromolecules and along all the polymeric chains, which be the most random possible. Another characteristic of this process is the stability of the catalytically active centers during the polymerization. This is achieved, according a non-limiting interpretation, especially due to the complexing power exerted by catalytic component (b) and by the aromatic solvent on the active center. Since also the ethylene, the propylene and the butadiene are complexed in the catalytic centers, the molar ratios between these are significant for the stability of the catalytic complex. Also the temperature is chosen in such a way as to ensure and favor the stability of the catalytic complex. The stability of the catalytic complex is fundamental for obtaining a homogeneous insertion of the butadiene units in the terpolymer and for obtaining a high molecular weight, thus overcoming the normal tendency of the butadiene to cause chain transfers and breaks. These latter would cause, as in the prior art processes, the formation of blocks of polybutadiene and low molecular weight of the copolymers. The particular catalytic complex, furthermore has the function of increasing the reactivity of the butadiene thereby promoting formation of copolymers that are richer in butadiene units.

A further surprising characteristics of this process is the fact that it is specific for butadiene as the conjugated diene. Isoprene is not suitable for the purpose. In the characteristic conditions of this invention, the use of isoprene instead of butadiene leads to the formation of copolymers containing only low amounts of isoprenic units and which are not vulcanizable with sulphur. This is in contrast with what is known from the prior art, where butadiene and isoprene are indicated as equivalent termonomers for copolymerization with ethylene and propylene.

The use of water or of other oxygenated compounds as active components of Ziegler-Natta catalysts for polymerization is already known from the prior art. Water is, however, usefully used essentially in the homopolymerization of conjugated dienes in the presence of Ziegler-Natta catalysts containing cobalt or nickel as transition metal.

The function of the water and the product of its reaction with dialkylaluminum monohalide, in these cases is that of boosting the homopolymerization speed and of inducing the formation of polymers of higher molecular weight (see for instance M. Gippin, loc. cit., British Pat. No. 884.071; Italian Pat. 650,901). The boosting effect on the polymerization speed exerted by water as a catalyst component is also known in the homopolymerization of olefins to unsaturated polyalkenamers in the presence of Ziegler-Natta catalysts using tungsten as a transition metal (see Italian Pat. 778,370). On the contrary, little known is the use of water as a catalytic component in the case of Ziegler-Natta catalysts containing the most commonly used transition metals of the IV–B and V–B groups, in particular titanium and vanadium, and its effect is rather controversial.

In German Pat. 1,022,382 there is described the use of water as a catalytic component of systems containing titanium as a transition metal for the polymerization of monoolefins. In such a case the water would only have the effect of increasing the activity of the catalyst. In Dutch patent application 6,600,393, also there is described the use of Ziegler-Natta catalysts having titanium as a transition metal, in which catalysts the water or similar oxygenated compounds such as alcohols or hydroperoxides, constitutes an active catalytic component, for the homopolymerization of conjugated dienes. In such a case, however, the water induces the formation of partially cyclized polymers, that is, polymers containing saturated monomeric units originated through the cyclizing of the original unsaturated unit. This effect would, therefore, be negative for the purposes of this invention.

K. Vesely, J. Ambroz, R. Vilim and O. Hamrik (Jour. Polymer Sci. 55, 25 (1961)), ascertained a sensible reduction of the activity of Ziegler-Natta catalysts in the homopolymerization of propylene due to the presence of slight quantities of water. Because of this negative effect of the water, in general it is advised, when polymerizing ethylene or alpha-olefins or when copolymerizing them with conjugated diene in the presence of Ziegler-Natta catalysts containing titanium or vanadium as transition metal, to avoid the presence of water in the reaction mixture (see, for instance, Dutch Pat. appl. No. 6,613,606).

Thus it was not foreseeable that water as the active component of a Ziegler-Natta catalyst containing vanadium as a transition metal, could have had a positive effect on the ethylene-propylene-butadiene polymerization. Even less was it foreseeable that the positive effect would be that of making the distribution of the three monomeric units along the polymeric chains essentially random.

Particularly new and surprising in this process is the function of the water and of its reaction products with dialkylaluminum halides as active catalytic components, to regulate in a random way the distribution of the monomeric units of copolymerization. Furthermore, the capability of the water to improve the solubility of the catalytic complex is believed previously unknown.

New, in itself, is also the use of water as an active catalytic component in the copolymerization of alpha-olefins with a conjugated diene.

Moreover, also newly discovered is the capability of water to boost the reactivity of the butadiene in the copolymerization with olefins, and it is surprising that such boosted activity does not proceed to the detriment of the molecular weight because of chain transfers.

The following examples are given for purely illustrative and non-limiting purposes. Some of the examples serve only to illustrate the negative results obtained when one does not operate according to this invention. In the description of the examples the symbols and abbreviations are thus defined:

All measures, when not otherwise indicated, are carried out at 23° C.;
Stress/strain tests have been carried out on the sample according to ASTM–D412.
CR=tensile strength (in kg./sq. cm.);
AR=elongation at break (in percent);
$M_{300}$=elastic modulus at 300% of elongation (in kg./sq. cm.);
$M_{200}$=elastic modulus at 200% of elongation (in kg./sq. cm.);
$M_{100}$=same as above at 100% of elongation;
$D_1$=elastic deformation: sample stretched for 1 hour by 200%, then relaxed and measured after 1 minute (in percent);
$DR_{10}$=permanent set: sample stretched to breaking point and then measured after 10 minutes (in percent);

Other measures:

ML=Mooney viscosity (ML 1+4) of the pure polymer, measured at 100° C.
IRHD=international rubber hardness degree;
$\Delta T$=heat built up, measured at 50° C. and respectively at 100° C. with a Goodrich flexometer (in ° C.);
$\eta_i$=inherent viscosity (in dl./g.) in a solution of tetraline at 135° C. (concentration of 0.25%);
$[\eta]$=intrinsic viscosity (in dl./g.) in a solution of Tetralin at 125° C.;

Other definitions:

$P_0$=parts by weight,
p.p.m.=parts by weight per million,
$C_2$=ethylene units (in percent by weight),
$C_3$=propylene units (in percent by weight),
$C_4$=trans-1,4-butadiene unit (in percent by weight), Vulcanizing agents:

S=sulphur
HAF=carbon black of the high abrasion furnace type,
ISAF=carbon black of the intermediate super abrasion furnace type,
MBT=mercaptobenzothiazol,
TMTMS=tetramethylthiuram monosulphide,
SWC=Santowhite crystals (4,4' thio-bis (6-tert. butyl-m. creosol),
AL=lauric acid,
AS=stearic acid,
ZnO=zinc oxide,
PBNA=phenyl-beta-naphthylamine, Catalytic agents:

VA=triacetylacetonate vanadium,
Al/V=aluminum atoms of all the organic aluminum compounds per vanadium atoms in the catalytic system,
Alc/Alb=aluminum atoms in catalytic compound (c) per aluminum atoms in the catalytic compound (b),
M/V=mols of sum of monomers per vanadium atoms,
P/D=moles of propylene per mole of conjugated diene,
ata.=absolute atmospheres,
ate.=actual atmospheres (ate.=ata.+1.

All operations were effected in an inert gas atmosphere.
All the copolymers of the Examples 1 to 14 and 18 to 28 were completely amorphous under examination with X-rays at room temperature.

The determination of the butadienic units in the copolymers was carried out according to the infrared method, using the 965 cm.$^{-1}$ band, characteristic of the trans-internal double bonds. The base line for the reading of the absorption of this band was taken considering the absorption present in the same area, due to the propylene units. The following formula was used for the purpose:

butadiene trans–1,4 unit (percent by weight)

$$=\frac{A_{965}}{A_{4300}} \times 1.0$$

The propylene units were determined according to the Bucci and Simonazzi method in "La Chimica e l'Industria" (Milano) 44, 262 (1962).

The inherent and intrinsic viscosities were defined according to F. W. Billmeyer, Jr., Textbook of Polymer Science—J. Wiley & Sons Inc., New York, 1969, page 80. By "Formula 1" we mean the following formula of conventional vulcanization:

100 parts of copolymer
50 parts of HAF
0.5 part of SWC
1 part of AS
5 parts of ZnO
0.5 part of MBT
1.5 parts of TMTMS
2 parts of S and, where not otherwise specified, the vulcanization was carried out at 150° C. for 60 minutes.

EXAMPLE 1

In a 4 liter stainless steel autoclave provided with a mechanical blade stirrer and with a jacket for cooling liquid circulation, a vacuum is made by means of a mechanical pump and a solution is sucked in, of the following composition:

720 ml. of toluene containing dissolved in it 50 p.p.m. of water,
31 g. of butadiene,
5 g. of diethylaluminum monochloride.

The whole mixture was then subjected to stirring and there were added 830 g. of propylene containing dissolved in it 200 p.p.m. of water.

The mass was then cooled down to 2° C. and, by means of ethylene pressure, there was injected a solution of:

0.30 g. of VA in 30 ml. of anhydrous toluene.

From a bottle whose pressure reduction valve was set to 8 ata., was then fed the ethylene.

Al/V=48; Alc/Alb=0.9:1; M/V=23,000; P/D=35.

Thereupon the polymerization was started and the operational temperature was kept throughout its course between 0 and 4° C. by means of circulation of refrigerating liquid. Throughout the test which lasted 2 hours, the whole reaction mass was kept under vigorous stirring.

The polymerization was then interrupted by injecting 30 ml. of methanol. The gases were discharged from the reactor and the polymer was coagulated by pouring the mixture into 4 l. of methanol acidified with 50 ml. of hydrochloric acid at 38%. After having been washed with additional methanol, the polymer was dried under vacuum at 40° C.

In this way there were obtained 100 g. of copolymer displaying the following characteristics:

$C_3$=34; $C_4$=1.7; $\eta$=2.33; ML=125

The polymer proved to be completely soluble in benzene or n-heptane at room temperature.

A part of the polymer was vulcanized at 150° C. with formulation 1 for different periods of time. The results concerning the elastic-mechanical properties are reported in the following table:

| Time of vulcanization in minutes | CR | AR | $M_{300}$ | $M_{200}$ | $DE_{10}$ | $D_1$ |
|---|---|---|---|---|---|---|
| 15 | 303 | 560 | 104 | 52 | 24 | 10 |
| 30 | 290 | 500 | 134 | 66 | 16 | 10 |
| 60 | 290 | 460 | 156 | 71 | 14 | 9 |
| 90 | 270 | 460 | 150 | 69 | 16 | 9 |
| 120 | 277 | 440 | 156 | 73 | 14 | 9 |
| 240 | 270 | 440 | 146 | 71 | 14 | 10 |

Another part of the polymer was vulcanized at 150° C. for 60 minutes with a modified formula (Formula 2) which differs from Formula 1 in that:

80 p. of ISAF are substituted for 50 p. of HAF, 0.75 p. of MBT are substituted for 0.5 p., and 50 p. of Flexon 60 oil are added. The Mooney viscosity of this mix was 76.

The elastic-mechanical and dynamic properties of this vulcanized product were:

$CR=271$; $AR=640$; $M_{300}=73$; $M_{200}=34$; $DR_{10}=24$; $D_1=14$; $\Delta T$ (at 50° C.)$=30$; $\Delta T$ (at 100° C.)$=31$.

Still another part of the polymer was vulcanized at 150° C. for 60 minutes with a formulation still different and composed as follows:

100 p. of copolymer; 0.5 p. of Flectol H (1,2-dihydro-2,2,4-trimethyl-quinoline polymer); 50 p. of Circosol 42 XH oil, 80 p. of ISAF, 1 p. AS; 5 p. of ZnO; 0.75 p. of MBT; 1.5 p. of TMTMS; 1.5 p. of S.

The polymer thus vulcanized was submitted to a test for resistance to aging, in a stove at 150° C. The samples were then subjected at time intervals to tensile stress tests and the results are indicated on the following table:

| Aging time at 159° C. | CR | AR | $M_{300}$ | $M_{200}$ | $M_{100}$ |
|---|---|---|---|---|---|
| Zero | 245 | 700 | 67 | 36 | 18 |
| 1 day | 180 | 450 | 114 | 62 | 30 |
| 2 days | 160 | 380 | 126 | 78 | 36 |
| 4 days | 154 | 340 | 142 | 93 | 45 |
| 8 days | 127 | 280 | | 96 | 55 |

From this table it will be seen that after 8 days of aging at 150° C., the polymer still maintains 52% of the initial CR and 40% of the initial AR. The $M_{300}$ is still retained after at least 4 days of aging.

The same vulcanized product was subjected to a test of resistance to ozone; in the presence of a concentration of 50 p. of $O_3$ per $100 \times 10^6$ p. of air at room temperature and with an elongation of 40%, it resists without flaws or breakages for more than 500 hours.

EXAMPLE 2

The polymerization was carried out under the same conditions and with the same technical procedures as in Example 1, by operating, however, in a 800 ml. autoclave, and with the following reactants added in the order listed:

160 ml. of toluene containing dissolved 80 p.p.m. of water,
5.2 g. of butadiene,
1.5 g. of diethyl-aluminum monochloride,
220 g. of propylene containing dissolved 200 p.p.m. of water,
0.10 g. of VA dissolved in 20 ml. toluene,
ethylene up to a pressure of the reduction valve of 7.5 ata.

Operational temperature: 0° C.; duration: 4 hours.

$Al/V=44$; $Alc/Alb=0.53:1$; $M/V=18,000$; $P/D=54.5$.

Yield: 27 g. of polymer.

Characteristics of the polymer: $C_3=36$, $C_4=1.8$, $\eta_5=2.1$, ML$=86$; soluble in benzene or n-heptane at room temperature.

Characteristics of the copolymer copolymerized with Formula 1:

$CR=312$; $AR=540$; $M_{300}=128$; $M_{200}=56$; $DR_{10}=24$; $D_1=11$

EXAMPLE 3

The polymerization was carried out under the same conditions and with the same technique as those of Example 2. The reactants were the same with the only difference that instead of 5.2 g. there were used 7.8 g. of butadiene. $P/D=36$.

The yield was 24 g. of copolymer.

The characteristics of the copolymer were:

$C_3=30.5$; $C_4=3.5$; $\eta_1=2.0$; ML$=71$.

It was soluble in benzene or n-heptane at room temperature.

The characteristics of the copolymer vulcanized with Formula 1 were:

$CR=263$; $AR=420$; $M_{300}=165$; $M_{200}=80$; $DR_{10}=10$; $D_1=9$.

EXAMPLE 4

The polymerization was carried out under the same conditions and with the same procedures as in Example 1. The reactants were the same with the only difference that instead of toluene containing dissolved in it 50 p.p.m. of water there was used toluene containing dissolved in it 120 p.p.m. of water.

$Al/V=48$; $Alc/Alb=0.53:1$; $M/V=23,000$; $P/D=35$

The yield proved to be 100 g. of copolymer.

The characteristics of the copolymer were:

$C_3=30$; $C_4=3.5$; $\eta_1=2.17$; ML$=107$.

It was soluble in toluene or n-heptane at room temperature.

The characteristics of the copolymer vulcanized with Formula 1 were:

$CR=265$; $AR=400$; $M_{300}=185$; $M_{200}=95$; $DR_{10}=12$; $D_1=10$.

The characteristics of the copolymer vulcanized with Formula 2 of Example 1 were:

$CR=245$; $AR=610$; $M_{300}=82$; $M_{200}=34$; $DR_{10}=20$; $D_1=12.5$; $\Delta T$ (at 50° C.)$=30$; $\Delta T$ (at 100° C.)$=26$.

EXAMPLE 5

The polymerization was carried out under the same conditions and with the same procedures as those used in Example 2, using the following reactants:

160 ml. of anhydrous benzene,
1.7 g. of diethyl-aluminum monochloride,
7.8 g. of butadiene,
210 g. of propylene containing dissolved in it 200 p.p.m. of water,
2.2 atm. of partial pressure of ethylene,
0.10 g. of VA dissolved in 20 ml. of benzene which were added last.

$Al/V=48$; $Alc/Alb=2.2:1$; $M/V=17,500$; $P/D=34.5$.

Operational temperature was 0° C.; the duration was 2 hours.

The yield in copolymer was 24 g.

The characteristics of the copolymer were:

$C_3=31$; $C_4=1.7$; $\eta_1=1.43$; ML$=33$.

It was soluble in benzene or n-heptane at room temperature.

The characteristics of the copolymer vulcanized with Formula 1 were:

$CR=217$; $AR=540$; $M_{300}=102$; $M_{200}=59$; $D_1=18$.

EXAMPLE 6

The polymerization was carried out in a stainless steel autoclave of 20 l. holding capacity, provided with a mechanical blade stirrer and fitted with a jacket with circulating cooling liquid. Into the autoclave were then introduced:

4,400 ml. of anhydrous toluene,
20 g. of the reaction product between diethylaluminum monochloride and water in molar ratio 2:1 (prepared according to L. Porri et al.—J. Polymer Sci., part B, 5, 325 (1967), and by completing the reaction at 80° C. for 3 hours),
20 g. of diethyl-aluminum monochloride,
400 ml. of butadiene,
5,200 g. of anhydrous propylene, and after cooling down to 0° C., under vigorous stirring there were established:

1.4 atm. of partial pressure of ethylene;

and finally were added:

2.0 g. of VA dissolved in 100 ml. of toluene.
$Al/V=54$; $Alc/Alb=1.15:1$; $M/V=22,000$; $P/D=26$ Operational temperature: 0° C.; duration: 4 hours.
The yield in copolymer was 850 g.
The characteristics of the copolymers were:

$C_3=30$; $C_4=2.1$; $ML>100$.

The characteristics of the copolymer vulcanized with the modified Formula 1 (0.75 p. MBT instead of 0.5 p.) were:

$CR=261$; $AR=440$; $M_{300}=169$; $M_{200}=89$; $D_1=11$; $IRHD=80$.

EXAMPLE 7

The polymerization was carried out in a 2 l. glass autoclave, provided with a mechanical blade stirrer and with a cooling jacket with refrigerating liquid circulation.

The procedures and conditions were the same as those of Example 6.

The following reactants were then introduced into the autoclave:

450 ml. of anhydrous toluene containing dissolved in it 2.0 g. of diethyl aluminum monochloride and
2.0 g. of the reaction product between diethyl aluminum monochloride and water, in a molar ratio of 2:1 (prepared according to L. Porri et al., loc. cit., completing the reaction at 80° C. for 3 hours),
25 g. of butadiene,
520 g. of anhydrated propylene, and, after cooling down to 0° C., under vigorous stirring, there were established 1.5 atm. of partial pressure of ethylene;

finally there were added:

0.20 g. of VA dissolved in 20 ml. of anhydrous toluene.

$Al/V=54$; $Alc/Alb=1.15:1$; $M/V=22,000$; $P/D=27$.

The operational temperature was 0° C., while the duration was 3 hours and 30 minutes. The yield in copolymer amounted to 110 g.

The characteristics of the copolymer were:

$C_3=36.5$; $C_4=2.9$; $[\eta]=1.9$; $ML=74$;

it was soluble in toluene or n-heptane at room temperature.

The characteristics of the copolymer vulcanized with modified Formula 1 as in Example 6 were:

$CR=254$; $AR=420$; $M_{300}=176$; $M_{200}=96$; $D_1=11$; $IRHD=80$.

EXAMPLE 8

The polymerization was carried out under the same conditions and with the same procedures as those of Example 2, by introducing the following reactants in the given order:

180 ml. of toluene containing dissolved in it 130 p.p.m. of water,
8 g. of butadiene,
1.7 ml. of diethyl aluminum monochloride,
210 g. of propylene containing dissolved in it 200 p.p.m. of water,
0.1 g. of VA,
Ethylene up to a pressure of the reduction valve of 8 ata.

The operational temperature was: 2° C., while the duration was 3 hours.

$Al/V=48$; $Alc/Alb=1:1.05$; $M/V=17,500$; $P/D=34$.

The yield in copolymer was 23.
The characteristics of the copolymer were:

$C_3=38$; $C_4=2.7$; $\eta_1=1.71$; $ML=61$;

it was soluble in benzene or n-heptane at room temperature.

A part of the copolymer was vulcanized at 150° C. for 60 minutes with the following formulation:

100 p. of copolymer. 1 p. of PBNA, 2 p. AL, 5 p. ZnO, 0.5 p. of MBT, 1 p. of tetramethylthiuram disulphide, 4 p. of S.

The elastic-mechanical characteristics of this vulcanized copolymer turned out to be:

$CR=35$; $AR=470$; $M_{300}=14$; $M_{200}=12$; $DR_{10}=16$.

Another part of the copolymer was vulcanized with Formula 1, giving the following results:

$CR=274$; $AR=460$; $M_{300}=154$; $M_{200}=78$; $DR_{10}=20$; $D_1=10$.

The comparison with the characteristics of the vulcanized copolymer not filled with carbon black but filled with 50 p. of HAF, evidences the reinforcing effect exerted by the active filler.

EXAMPLE 9

The polymerization was carried out under the conditions and according to the procedures described in Example 2, by introducing the following reactants in the given order:

250 ml. of toluene containing dissolved in it 50 p.p.m. of water,
10.4 g. of butadiene,
1.0 g. of diethyl aluminum monochloride,
150 g. of propylene containing dissolved in it 200 p.p.m. of water,
0.10 g. of VA dissolved in 10 ml. of anhydrous toluene, injected under ethylene pressure,
Total of 18 g. of ethylene fed during the whole course of the test at the total pressure indicated by the pressure reducer of the feeding bottle as 7.5 ata.

$Al/V=29$; $Alc/Alb=1:1.1$; $M/V=12,500$; $P/D=19$.

The operational temperature was 0° C., while the duration was 3 hours.

The yield in copolymer amounted to 26 g.
The characteristics of the copolymer were:

$C_3=27$; $C_4=8.5$; $\eta_1=1.76$; $ML=65$;

it was soluble in benzene or n-heptane at room temperature.

The characteristics of the copolymer vulcanized with Formula 1 were:

$CR=271$; $AR=400$; $M_{300}=185$; $M_{200}=92$; $DR_{10}=16$; $D_1=17$.

EXAMPLE 10

The polymerization was carried out in the autoclave of Example 2, but following the procedures of Example 6:

1.5 g. of diethyl aluminum monochloride are put into a glass flask and under stirring there are slowly admixed, 250 ml. of toluene containing dissolved in it 220 p.p.m. of water.

The solution was then heated up to 80° C. for 30 minutes, cooled down and finally introduced into the 800 ml. autoclave and further cooled down to 0° C. There were then added:

10.4 g. of butadiene,
150 g. of anhydrous propylene,
0.10 g. of VA,
15 g. of ethylene with the technique described in Example 9, $Al/V=43$; $Alc/Alb=1.05:1$; $M/V=12,500$; $P/D=20$.

The operational temperature was 0° C., while the duration amounted to 3 hours.
The yield in copolymer amounted to 23 g.
The characteristics of the copolymer were:

$C_3=29$; $C_4=12$; $\eta_i=1.65$; ML=46;

its solubility was the same as that of Example 1.
The characteristics of the copolymer vulcanized with Formula 1 were:

$CR=250$; $AR=360$; $M_{300}=202$; $M_{200}=103$; $DR_{10}=12$; $D_1=10$.

EXAMPLE 11

The polymerization was carried out in the same autoclave described in Example 1, by introducing into it in the given order:

720 ml. of toluene containing dissolved in it 75 p.p.m. of water,
30 ml. of butadiene,
0.5 ml. of diethyl aluminum monochloride.

The mixture was cooled down to 0° C. and was subjected to stirring; then there were added:

800 g. of propylene containing dissolved in it 200 p.p.m. of water,
1.8 atm. of partial pressure of ethylene,
0.30 g. of VA dissolved in 20 ml. of toluene and fed in over a period of 7 minutes.

$Al/V=48$; $Alc/Alb=1.8:1$; $M/V=15,000$; $P/D=54$.

The operational temperature was between 0° and 4° C.; the duration was 1 hour and 30 minutes. The operational pressure was regulated by varying the partial ethylene pressure according to the curves of ternari equilibrium toluene-propylene-ethylene, so as to keep constant the ratio propylene/ethylene in liquid phase. The yield of copolymer turned out to be 90 g. The characteristics of the copolymer were the following:

$C_3=43$; $C_4=1.6$; $\eta_i=1.69$; ML=63;

its solubility was the same as in Example 1.
The characteristics of the copolymer vulcanized with Formula 1 turned out to be:

$CR=240$; $AR=540$; $M_{300}=105$; $M_{200}=56$; $DR_{10}=25$; $D_1=18$.

EXAMPLE 12

The polymerization was carried out following the procedures described in Example 2, by feeding into the autoclave in the indicated order:

20 ml. of anhydrous toluene,
7.8 g. of butadiene,
1.5 ml. of diethyl aluminum monochloride,
210 g. of propylene containing dissolved in its 200 p.p.m. of water.

This mixture was then cooled down under vigorous stirring to 25° C. and then there were added:

0.10 g. of VCl$_4$ dissolved in 20 ml. of anhydrous toluene, ethylene up to reaching a constant total pressure, as set on the pressure reducer of the ethylene cylinder, of 5 ata.

$Al/V=44$; $Alc/Alb=1.7:1$; $M/V=17,000$; $P/D=35$.

The operational temperature was −20° C. while the duration amounted to 2 hours. The yield in copolymer turned out to be 22 g.

The characteristics of the copolymer were:

$C_3=36$; $C_4=5.5$; $\eta_i=1.55$; ML=44;

the solubility was the same as that of Example 1.
The characteristics of the copolymer vulcanized with Formula 1 were:

$CR=234$; $AR=520$; $M_{300}=113$; $M_{200}=62$; $DR_{10}=28$; $D_1=17$.

EXAMPLE 13

The polymerization was carried out following the same procedures as those of Example 2, but with a reduced quantity of aromatic solvent, so that the copolymer precipitated from the solution during the polymerization. Into the autoclave were introduced:

217 g. of propylene containing dissolved in it 200 p.p.m. of water,
6.5 g. of butadiene,
1.5 ml. of diethyl aluminum monochloride dissolved in 5 ml. of toluene.

This mixture was then subjected to stirring for 20 minutes at 20° C.; then it was cooled down to −20° C. and there were added to it:

0.10 g. of VA dissolved in 5 ml. of anhydrous toluene, fed by means of ethylene pressure;
the ethylene was fed until reaching a total pressure of 4.8 ata., corresponding to a partial ethylene pressure of 1.5 atm.

$Al/V=43$; $Alc/Alb=1.6:1$; $M/V=18,000$; $P/D=43$.

The operational temperature was −20° C. while the duration amounted to 2 hours. The yield in copolymer turned out to be 18 g.

The characteristics of the copolymer were:

$C_3=34.5$; $C_4=1.3$; $\eta_i=1.68$;

its solubility was as in Example 1.
The characteristics of the copolymer vulcanized with Formula 1, were:

$CR=271$; $AR=630$; $M_{300}=85$; $M_{200}=42$; $DR_{10}=32$; $D_1=15$.

EXAMPLE 14

The polymerization was carried out under the same conditions and following the same procedures as those described in Example 7, using:

450 ml. of anhydrous toluene containing dissolved in it:
  1.0 g. of diethyl aluminum monochloride and
  1.0 g. of the reaction product between diethyl aluminum monochloride and water in a molar ratio of 2:1, prepared according to L. Porri, loc. cit., completing the reaction at 50° C. for 1 hour,
16.3 g. of butadiene,
520 g. of anhydrous propylene and at 0° C. under vigorous stirring:
  1.5 atm. of partial ethylene pressure, kept constant throughout the test.
0.26 g. of VA dissolved in 20 ml. of anhydrous toluene.

$Al/V=22$; $Alc/Alb=1.05:1$; $M/V=19,300$; $P/D=41$.

The operational temperature was 0° C., while the duration amounted to 2 hours.
The yield in copolymer turned out to be 100 g.
The characteristics of the copolymer were:

$C_3=34$; $C_4=1.9$; $[\eta]=2.1$; ML=108;

its solubility was the same as that of Example 1.

The characteristics of the copolymer vulcanized with Formula 1 modified as in Example 6, turned out to be:

$CR=253$; $AR=445$; $M_{300}=154$; $M_{200}=80$; $D_1=11.5$; IRHD=82.

EXAMPLE 15

The polymerization was carried out as in the preceding example but in the total absence of water. For the preparation of the catalytic system there were, thus, used in all 2 g. of diethyl aluminum monochloride.

The yield in copolymer turned out to be 60 g.

The characteristics of the copolymer turned out to be:

$C_3=26.5$; $C_4=0.3$; $[\eta]=1.7$; ML=50;

its solubility was the same as in Example 1.

The characteristics of the copolymer vulcanized with Formula 1 modified as in Example 6 was such that the copolymer was not vulcanizable and did not supply an elastic rubber because of insufficient content of unsaturation.

This test serves to prove the necessity of the presence in the catalytic system of component (b).

EXAMPLE 16

The polymerization was carried out under the same conditions and with the same reactants used in Example 3, but substituting completely the aromatic solvent (toluene by an equal volume of aliphatic solvent (n-heptane). The quantity of butadiene was increased from 7.8 to 13 g.

The yield in copolymer turned out to be: 5.3 g.; $P/D=22$.

Only 48% of the copolymer was soluble in benzene at room temperature.

The characteristics were determined only on the fraction soluble in benzene, and they were:

$C_3=34.5$; $C_4=1.8$; $\eta_1=0.99$.

The characteristics of the copolymer vulcanized with Formula 1 were:

$CR=163$; $AR=500$; $M_{300}=87$; $M_{200}=51$; $DR_{10}=48$; $D_1=50$.

This copolymer thus yields an elastic rubber. This latter shows, however, the following drawbacks: not very high tensile strength; permanent set and elastic recovery of poor quality; low index of vulcanizability and a non-random distribution of the monomeric units along the chains.

This test serves to prove the usefulness of the presence of the aromatic solvent.

EXAMPLE 17

The copolymer of Example 9 was co-vulcanized for 40 minutes at 150° C. with natural rubber, using the following formula:

75 p. of natural rubber
25 p. of copolymer according to Example 9
0.2 p. of SWC
2 p. of AS
5 p. of ZnO
50 p. of HAF
1 p. of cyclo-hexylbenzothiazylsulphamide
2 p. of S The co-vulcanized product thus obtained showed the following characteristics:

$CR=155$; $AR=360$; $M_{300}=119$; $M_{200}=58$; $DR_{10}=20$; $D_1=18$.

EXAMPLE 18

The polymerization was carried out in a glass reactor of 1 l. holding capacity, provided with a mechanical blade stirrer and fitted with a jacket with circulation of refrigerating liquid. Into this reactor were introduced:

225 ml. of toluene containing dissolved in it:

3.76 mmoles of the reaction product between diethyl aluminum monochloride and water in a ratio of 2:1. This product was prepared by reacting the diethylaluminum monochloride with toluene containing dissolved in it the necessary quantity of water, for 20 days at room temperature and in a nitrogen atmosphere.

There were then added:

1.65 mmoles of monoethyl aluminum dichloride
1.65 mmoles of diethyl aluminum monochloride
2.6 ml. of butadiene
90 g. of anhydrous propylene.

This mixture was then brought down to 0° C. under vigorous stirring and into it were then introduced:

This mixture was then brought down to 0° C. under vigorous stirring and into it were then introduced:

ethylene until reaching a total pressure of 3.6 ata.
0.08 mmole of VA.

$Al/V=88$; $Alc/Alb=0.88:1$; $M/V=27,000$; $P/D=69$.

The operational temperature was 0° C., while the duration amounted to 20 minutes. The yield in copolymer turned out to be 15 g.

The characteristics of the copolymer were:

$C_3=40$; $C_4=2.9$; $\eta_1=2.55$;

its solubility was as in Example 1. The characteristics of the copolymer, vulcanized with Formula 1, was:

$CR=232$; $AR=440$; $M_{300}=130$; $M_{200}=64$; $DR_{10}=14$; $D_1=9$.

EXAMPLE 19

The polymerization was carried out in the same autoclave of Example 2 and following the procedures described in Example 7; there were introduced:

400 ml. of toluene containing dissolved in it the reaction product between
1.5 g. of diethyl-aluminum monochloride and
0.126 g. of water and there were added:

15 ml. of butadiene
460 g. of anhydrous propylene.

The mixture was then cooled down to 0° C. under constant stirring and then there were added:

1.8 atm. of partial pressure of ethylene
1.5 g. of isobutyl aluminum sesquichloride dissolved in 20 ml. of anhydrous toluene
0.15 g. of VA dissolved in 20 ml. of anhydrous toluene.

$Al/V=38$; $Alc/Alb=0.6:1$; $M/V=29,000$; $P/D=61$.

The operational temperature was kept at 0° C., while the duration was 2 hours.

The yield in copolymer was 56 g.

The characteristics of the copolymer were:

$C_3=40.5$; $C_4=2.0$; $[\eta]=3.1$; ML≫100;

its solubility was like that in Example 1.

The characteristics of the copolymer vulcanized with Formula 1 modified as in Example 6, were:

$CR=210$; $AR=395$; $M_{300}=150$; $M_{200}=80$; $D_1=9.5$; IRHD=80.

EXAMPLE 20

The polymerization was carried out as in Example 19, using:

420 ml. of toluene containing dissolved in it the reaction product between
1.5 g. of diethyl aluminum monochloride and
0.126 g. of water and then using 20 ml. of butadiene 460 g. of anhydrous propylene and, after cooling down to 0° C. under vigorous stirring
1.8 atm. of partial ethylene pressure
1.5 g. of isobutylaluminum sesquichloride dissolved in 20 ml. of anhydrous toluene
0.15 g. VA dissolved in 20 ml. of anhydrous toluene.

$Al/V=38$; $Alc/Alb=0.6:1$; $M/V=29,000$; $P/D=46$.

The operational temperature was 0° C., while the duration amounted to 3 hours.
The yield in copolymer turned out to be 50 g.
The characteristics of the copolymer were:

$C_3=39$; $C_4=3.3$; $[\eta]=3.0$; $ML\gg100$;

its solubility was as in Example 1.
The characteristics of the copolymer vulcanized with Formula 1 modified as in Example 6, were:
$CR=189$; $AR=365$; $M_{300}=153$; $M_{200}=83$; $D_1=9.5$; $IRHD=78$.

EXAMPLE 21

The polymerization was carried out as in Example 19, using:

400 ml. of toluene containing dissolved in it the reaction product between:
1.5 g. of diethylaluminum monochloride and
0.126 g. of water, and then 25 ml. of butadiene
460 g. of anhydrous propylene and, after cooling down to 0° C. under vigorous stirring 1.3 atm. of partial ethylene pressure
1.5 g. of isobutyl-aluminum sesquichloride dissolved in 20 ml. of anhydrous toluene
0.20 g. of VA dissolved in 20 ml. of anhydrous toluene.

$Al/V=28.5$; $Alc/Alb=0.6:1$; $M/V=21,500$; $P/D=37$.

The operational temperature was kept at 0° C., while the duration amounted to 2 hours. The yield in copolymer was 50 g.
The characteristics of the copolymer were:

$C_3=46$; $C_4=7.6$; $[\eta]=1.8$; $ML=66$;

its solubility was the same as in Example 1.
The characteristics of the copolymer vulcanized with Formula 1 as modified in Example 6, were:

$CR=205$; $AR=370$; $M_{300}=174$; $M_{200}=101$; $D_1=10.5$; $IRHD=78$.

EXAMPLE 22

The polymerization was carried out according to the same procedures of Example 2, using:

120 ml. of anhydrous toluene
0.55 g. of diethylaluminum monochloride
2.6 g. of butadiene
197 g. of propylene containing dissolved in it 210 p.p.m. of water.

After cooling down to 0° C. under stirring, there was then added a mixture of:

0.2 g. of diethylaluminum monochloride
0.45 g. of monoethylaluminum dichloride
15 ml. of anhydrous toluene then 0.065 g. of VA dissolved in 15 ml. of anhydrous toluene by ethylene pressure
2 atm. of partial ethylene pressure until reaching a total pressure of 6.5 ata.

$Al/V=135$; $Alc/Alb=1.2:1$; $M/V=24,000$; $P/D=26$.

The operational temperature was 0° C., while the duration amounted to 3 hours.
The yield in copolymer was 15 g.
The characteristics of the copolymer were:

$C_3=45$; $C_4=5.1$, $\eta_1=2.38$; $ML>100$;

its solubility was as in Example 1.
The characteristics of the copolymer vulcanized with Formula 1 was:

$CR=194$; $AR=340$; $M_{300}=171$; $M_{200}=93$; $D_1=11$.

EXAMPLE 23

The polymerization was carried out according to the procedures and under the conditions of Example 6, using:

4500 ml. of anhydrous toluene
15 g. of the reaction product between diethylaluminum monochloride and water
140 g. of butadiene
5200 g. of propylene.

After cooling down to 0° C. under a vigorous stirring, there were established 1.8 atm. of partial pressure of ethylene, which was kept constant throughout the test,
14 g. of isobutylaluminum sesquichloride,
1.5 g. of VA dissolved in 200 ml. of toluene.

$Al/V=50$; $Alc/Alb=0.8:1$; $M/V=30,000$; $P/D=48$.

The operational temperature was kept at 0° C. while the duration amounted to 1 hour and a half. The yield in copolymer was 550 g.
The characteristics of the copolymer were:

$C_3=41$; $C_4=4.2$; $[\eta]=2.5$; $ML\gg100$;

its solubility was as in Example 1.
The characteristics of the copolymer vulcanized with Formula 1 as modified according to Example 6, were:

$CR=196$; $AR=345$; $M_{300}=167$; $M_{200}=88$; $D_1=9$; $IRHD=79$.

EXAMPLE 24

The polymerization was carried out according to the procedures and under the conditions described in Example 23, using the same reactants with the difference of using 15 g. of isobutylaluminum sesquichloride instead of 14 g.

$Al/V=51$; $Alc/Alb=0.85:1$; $M/V=30,000$; $P/D=48$.

The yield in copolymer was 650 g.
The characteristics of the copolymer were:

$C_3=41$; $C_4=3.1$; $[\eta]=2.6$; $ML\gg100$;

its solubility was as in Example 1.
The characteristics of the copolymer vulcanized with Formula 1 modified as in Example 6, were:

$CR=220$; $AR=400$; $M_{300}=149$; $M_{200}=75$; $D_1=10$; $IRHD=79$.

EXAMPLE 25

The polymerization was carried out under the conditions and following the procedures of Example 6, using:

400 ml. of toluene containing dissolved in it 295 p.p.m. of water,
15 g. of diethylaluminum monochloride
136 g. of butadiene containing dissolved in it 120 p.p.m. of water,
5200 g. of propylene containing dissolved in it 50 p.p.m. of water.

The mixture was then cooled down to 0° C. under vigorous stirring, and there was then established:

1.8 atm. of partial ethylene pressure, which was maintained constant throughout the test. Finally there was added
15 g. of isobutylaluminum sesquichloride dissolved in 100 ml. of anhydrous toluene, 1.5 g. of VA dissolved in 100 ml. of anhydrous toluene.

$Al/V=53$; $Alc/Alb=79:1$; $M/V=30,000$; $P/D=49$.

The operational temperature was kept at 0° C., while the duration was 2 hours and 15 minutes.

The yield in copolymer was 370 g.

The characteristics of the copolymer were:

$C_3=37$; $C_4=4.1$; $ML\gg100$;

its solubility was as in Example 1.

The characteristics of the copolymer vulcanized with Formula 1 as modified in Example 6.

$CR=243$; $AR=390$; $M_{300}=180$; $M_{200}=92$; $D_1=7.5$; $IRHD=76$.

EXAMPLE 26

In an 800 ml. stainless steel autoclave provided with a mechanical blade stirrer, and fitted with a jacket for the circulation of a cooling liquid, there was formed a vacuum by means of a mechanical pump, whereafter there were introduced by suction the following reactants in the given order:

250 ml. of anhydrous toluene,
10.4 g. of butadiene,
1.0 g. of diethylaluminum monochloride,
2.25 g. of bis(tri-n.butyltin)oxide $[(nC_4H_9)_3Sn]_2O$,
150 g. of anhydrous propylene,
0.10 g. of VA dissolved in 10 ml. of anhydrous toluene.

This latter reactant was injected into the autoclave under ethylene pressure. The ethylene was fed from a steel cylinder whose pressure reducing valve was set at 7 ata.

$Al/V=29$; $Alc/Alb=0.1$; $M/V=12,500$; $P/D=19$.

The operational temperature was 0° C., and the reaction lasted 3 hours. The polymerization was then interrupted by injecting into the autoclave 30 ml. of methanol. The gases were discharged and the copolymer was coagulated by pouring the mixture into 1 l. of methanol acidified with 50 ml. of hydrochloric acid at 38%. After the washing with additional methanol, the copolymer was dried at 40° C. under vacuum.

The yield in copolymer ethylene-propylene-butadiene was: 15.5 g.

The characteristics of the copolymer were:

$C_3=28$; $C_4=12$; $\eta_1=1.58$;

it was soluble in toluene or in n-heptane at room temperature.

The copolymer thus obtained was then vulcanized with the following formulation:

|  | Parts by weight |
|---|---|
| Copolymer | 100 |
| Carbon black of the type high abrasion furnace | 50 |
| "Santowhite crystals" [4.4 - thio-bis(6-tert.butyl-m. creosol)] | 0.5 |
| Stearic acid | 1 |
| ZnO | 5 |
| Mercaptobenzothiazol | 0.5 |
| Tetramethylthiuram-monosulphide | 1.5 |
| S | 2 | at 150° C. for 60 minutes. The vulcanized copolymer showed the following characteristics:

$CR=214$; $AR=380$; $M_{300}=162$; $M_{200}=88$; $DR_{10}=18$; $D_1=15$.

EXAMPLE 27

The polymerization was conducted according to the technique described in Example 26. The following reactants were then introduced into the reactor:

180 ml. of anhydrous toluene,
7.8 g. of butadiene,
1.5 g. of diethylaluminum monochloride,
2.1 ml. of bis(tri-n.butyltin)oxide,
190 g. of anhydrous propylene.

This latter was injected under pressure of ethylene at a temperature of −5° C. The ethylene was fed from a cylinder whose pressure reducing valve was set at 6.5 ata.

$Al/V=43$; $Alc/Alb=0.5$; $M/V=16,000$; $P/D=31$.

The operational temperature was −5° C., while the reaction time was 2 hours.

The yield in ethylene-propylene-butadiene copolymer was 30 grams.

The characteristics of the copolymer were:

$C_3=43.5$; $C_4=1.7$; $\eta_1=1.37$; $ML=55$;

complete solubility at room temperature in benzene and n.heptane.

Characteristics of the copolymer vulcanized with the formulation of the preceding example were:

$CR=235$; $AR=540$; $M_{300}=96$; $M_{200}=48$; $DR_{10}=28$; $D_1=15$.

EXAMPLE 28

The process of Example 26 was repeated using also the same quantities of reactants, with the only difference being that instead of 2.5 g. of bis(tri-n.butyltin) oxide there were used 1.15 g.

In this way there were obtained the following ratios:

$Al/V=29$; $Alc/Alb=1.1$; $M/V=12,500$; $P/D=19$.

After 3 hours of polymerization at 0° C., at a constant pressure of 7.5 ata., there were obtained 22 g. of dry polymer of the following composition:

$$C_4=3; \quad C_3=27$$

The product was completely soluble in n-heptane and showed a $\eta_1=1.58$ and $ML=26$. The copolymer vulcanized with the formulation indicated in Example 1, showed the following physical-mechanical characteristics:

$CR=263$; $AR=390$; $M_{300}=190$; $M_{200}=100$; $DR_{10}=25$; $D_1=15$.

We claim:

1. A process for the preparation of high molecular weight copolymers of ethylene, propylene and 1,3-butadiene, which are linear, unsaturated, amorphous or substantially amorphous, soluble in n-heptane at a temperature of 25° C., vulcanizable with sulphur, in which copolymers the butadiene units show a 1,4-trans configuration, comprising contacting the above-mentioned monomers with a catalytic system prepared in the presence of an aromatic hydrocarbon and comprising:
   (a) at least one hydrocarbon-soluble vanadium compound selected from the group consisting of vanadium halides, vanadium oxyhalides, vanadium acetylacetonates, vanadyl acetylacetonates, vanadyl halogen-acetylacetonates, vanadium alcoholates and vanadyl halogen-alcoholates;
   (b) the product of the reaction between at least one dialkyl-aluminum monohalide having a linear or branched alkyl radical containing up to 16 carbon atoms and in which the halide is chlorine or bromine and a tin oxide of the formula $R_3Sn-O-SnR_3$, wherein $R_3$ is an alkyl radical containing up to 16 carbon atoms, in a molar ratio of 2:1, and
   (c) at least one organic aluminum compound containing halogen, the ratio between the aluminum atoms of components (b)+(c) and the vanadium atoms of compound (a) being between 10:1 and 60:1 and the molar ratio between component (c) and component (b) being between 1:10 and 10:1.

2. Process according to claim 1, wherein the vanadium compound soluble in hydrocarbons is vanadium triacetylacetonate.

3. Process according to claim 1 wherein component (b) of the catalytic system is prepared separately and is then put into contact with the other components of the catalytic system and with the monomers.

4. Process according to claim 1 wherein the catalytic system is prepared in the presence of an aromatic hydrocarbon selected from the group consisting of benzene, toluene, xylene, ethylbenzene, isopropylbenzene and their mixtures.

5. Process according to claim 1, wherein the preparation of the catalytic system is carried out at a temperature between −30° C. and +20° C.

6. Process according to claim 1, wherein the polymerization is carried out in the aromatic diluent in quantities from 2% to 80% by volume of the reaction mixture.

7. Process according to claim 1, wherein the polymerization is carried out in the absence of a diluent, except the aromatic hydrocarbon used for the preparation and feeding of the catalytic system, and by using as reaction medium the monomers themselves in the liquid state.

8. Process according to claim 1, wherein the polymerization is carried out in the presence of quantities of solvent for the copolymer insufficient to keep the copolymer itself dissolved during the course of the polymerization.

9. Process according to claim 1, wherein the polymerization is carried out in the presence of a solvent for the copolymer in quantities sufficient to keep the copolymer itself dissolved during the course of the polymerization.

10. Process according to claim 1 characterized in that the molar ratio between propylene and ethylene in the liquid phase is between 8:1 and 30:1.

11. Process according to claim 1, wherein the molar ratio between propylene and butadiene in the liquid phase is between 20:1 and 100:1.

12. Process according to claim 1, wherein component (c) of the catalytic system is diethyl aluminum monochloride, diisobutyl aluminum monochloride, alkylaluminum sesquichloride selected from the group consisting of ethylaluminum sesquichloride, isobutyl aluminum sesquichloride, mixtures of these sesquichlorides with each other, and mixtures of these with dialkyl aluminum monohalides.

13. Process according to claim 1 wherein the dialkyl aluminum monohalide used in the preparation of component (b) is diethyl aluminum monochloride or diisobutyl aluminum monochloride.

14. Process according to claim 13, wherein the tin oxide is bis (tri-n.butyltin) oxide.

References Cited
UNITED STATES PATENTS

| | | | |
|---|---|---|---|
| 3,184,416 | 5/1965 | Mottus | 252—429 |
| 3,280,082 | 10/1966 | Natta et al. | 260—80.7 |
| 3,506,632 | 4/1970 | Henderson | 260—85.3 |

JOSEPH L. SCHOFER, Primary Examiner

S. M. LEVIN, Assistant Examiner

U.S. Cl. X.R.

252—431 R; 260—23.7 M